J. J. GRANT.
MACHINE FOR DRILLING AND CUTTING SCREW THREADS.
No. 107,610. Patented Sept. 20, 1870.
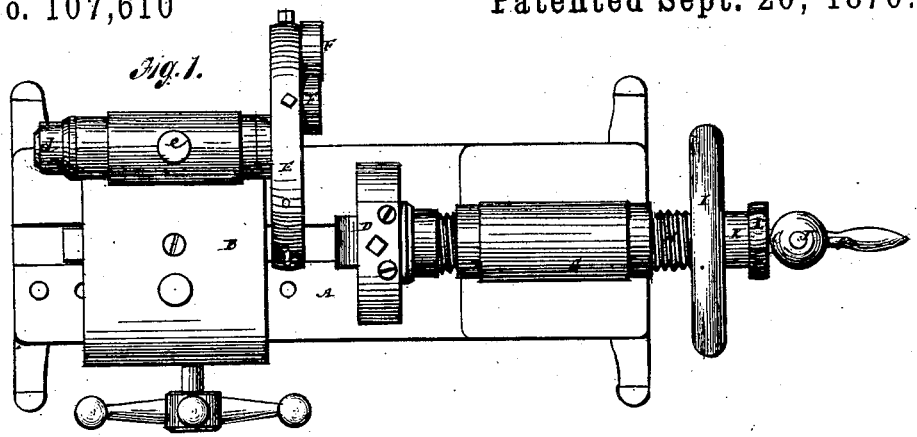
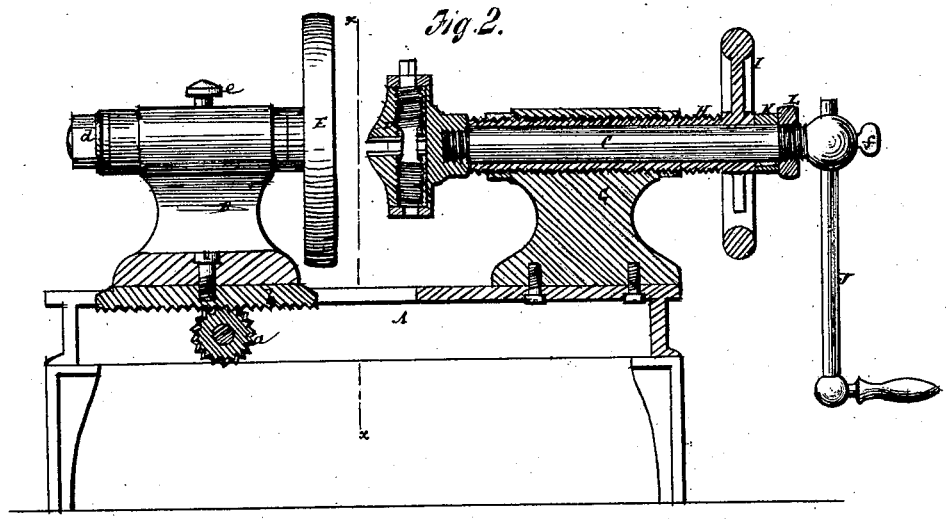
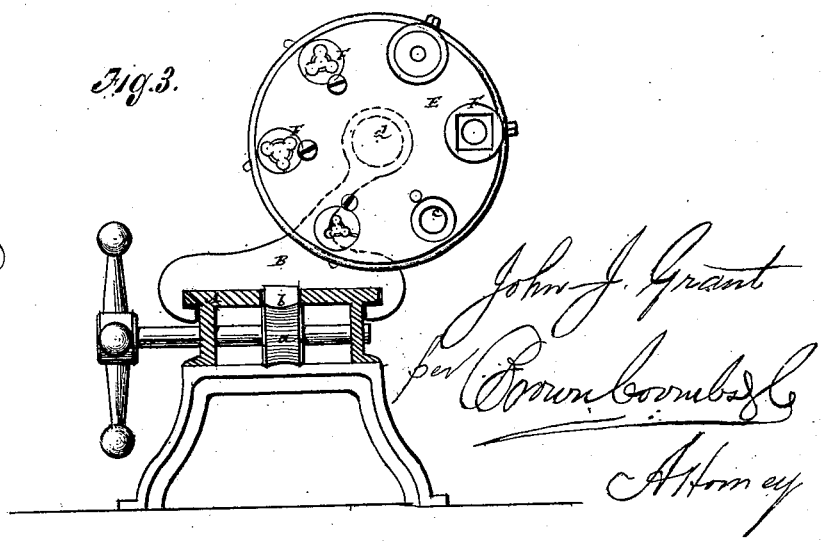
Witnesses.

United States Patent Office.

JOHN JAMES GRANT, OF GREENFIELD, MASSACHUSETTS, ASSIGNOR TO HIMSELF AND LUTHER C. PRATT, OF SAME PLACE.

*Letters Patent No. 107,610, dated September 20, 1870.*

IMPROVEMENT IN MACHINES FOR DRILLING AND CUTTING SCREW-THREADS.

The Schedule referred to in these Letters Patent and making part of the same.

*To all whom it may concern:*

Be it known that I, JOHN JAMES GRANT, of Greenfield, in the county of Franklin and State of Massachusetts, have invented a new and useful Improvement in Machines for Drilling and Cutting Screw-Threads, of which the following is a full, clear, and exact description, reference being had to the accompanying drawing forming part of this specification, and in which—

Figure 1 represents a plan of a machine constructed in accordance with my improvement;

Figure 2, a longitudinal sectional elevation of the same; and

Figure 3, a transverse section, taken as indicated by the line $x$ $x$ in fig. 2.

Similar letters of reference indicate corresponding parts.

The machine, which embraces my invention, is applicable either for drilling or cutting screw-threads on bolts and in nuts, and may be used with great advantage as a blacksmith's drill and bolt-cutter.

Said invention consists in a certain combination of a revolving chuck and its spindle or mandrel used to carry the tap or drill, a screw-sleeve capable of separate rotation and longitudinal feed, and a friction-nut with a sliding collar, whereby the bolt, tap, or drill is made to automatically control its feed by the back pressure thrown upon it through the resistance encountered by the work, and such feed made adjustable in any fixed ratio; also, whereby the tap or drill may be run back quickly.

Referring to the accompanying drawing—

A is the bed or shears of the machine, and

B a sliding head-stock arranged thereon, and which may be fed forward or backward by means of a pinion, $a$, made to gear with a rack, $b$, secured to the bottom of the head-stock.

This head-stock B is constructed to carry, on one side of it, and in eccentric relation with the working center of the mandrel C and tool or work-holding chuck D, carried by said mandrel, a disk, E, made free to turn, and having any number of holes, $c$, through it, the centers of which, and center of the disk-shaft $d$, being such that the disk may be turned to bring any one of said holes in center, line, or position with the mandrel C.

These holes through the disk answer either as openings for the drill to pass through work placed against the face of the disk, or to hold dies F, of different sizes and construction, according to the work to be done; thus they may either be plain dies, dies for holding nuts required to be screwed, or screw-dies for cutting threads on bolts.

A die-holding disk, thus arranged in relation to the mandrel or its chuck, D, which carries the drill, tap, or bolt, affords great facility for doing work of different sizes and character, or for relieving the dies when of the same size and description, by turning the disk at intervals to set the several dies, in succession, into working position opposite the mandrel C, and in which they may be locked by a pin, $e$, arranged to pass through the bearing of the head-stock B, in which the shaft carrying the disk is hung, and made to enter suitably-arranged divisions or holes in said shaft.

By means of the pinion $a$ and rack $b$, the head-stock B may be moved or pressed up toward the mandrel, to establish bite of the dies on the work on commencing to operate, as in the case of making the dies gripe a bolt to be screwed, or of the tap taking hold of a nut requiring to have a screw-thread cut in it.

The mandrel C is supported, but not in a direct manner, by a second head-stock, G, which may be a fixture on the shears, said mandrel being hung so as to freely rotate within a screw-sleeve, H, which fits a female thread in the eye or box portion of said head-stock.

I is a wheel, on the back end of the screw-sleeve, for rotating the latter, and screwing it in a forward or backward direction, as required, through the head-stock The mandrel C is made capable of being separately turned, by means of a lever-handle, J, fitted so that it can be adjusted, through the mandrel, to vary the working leverage, and secured, at any given leverage, by means of a set-screw, $f$.

The mandrel C is provided with a longitudinally-sliding collar, K, made to fit a feather thereon, and arranged outside or back of the wheel I, or back end of the screw-sleeve H, which sliding collar may be set to bear up, with more or less force, against the back end of the screw-sleeve, by means of a friction-nut, L, made to fit a screw-thread on the mandrel, and, in so doing, drawing back the latter, and inducing more or less friction of the chuck D against the forward end of the screw-sleeve.

By these means, although the mandrel C and chuck D, holding the work, tap, or drill, may be rotated by the lever J, without producing longitudinal travel or feed, yet the back pressure, induced by the resistance of the work thrown upon the chuck and mandrel against the forward end of the screw-sleeve, produces sufficient friction on the latter to slowly rotate it; and, in this way, the feed is made automatic, and may be regulated so as to be light or heavy, by slackening or tightening up, as required, the friction-nut L.

By these means, too, while the rotation of the chuck may be rapid, and its forward feed slow, yet, when it is required to run back the work, tap, or drill, the same may be done quickly by turning the screw-sleeve through the wheel I.

If desired, the disk E may be made to hold the bolt-tap or drill, and the chuck D the necessary dies.

What is here claimed, and desired to be secured by Letters Patent, is—

The combination of the screw-sleeve H, the revolving mandrel C, the friction-nut L, and sliding collar K, substantially as and for the purpose or purposes herein set forth.

JOHN J. GRANT.

Witnesses:
LUTHER C. PRATT,
MARCUS S. PRATT.